United States Patent
Slupik

(10) Patent No.: US 10,542,610 B1
(45) Date of Patent: Jan. 21, 2020

(54) COORDINATED PROCESSING OF PUBLISHED SENSOR VALUES WITHIN A DISTRIBUTED NETWORK

(71) Applicant: Silvair Sp. z o.o., Cracow (PL)

(72) Inventor: Szymon Slupik, Cracow (PL)

(73) Assignee: Silvar Sp. z o.o., Cracow (PL)

( * ) Notice: Subject to any disclaimer, the term of this patent is extended or adjusted under 35 U.S.C. 154(b) by 0 days.

(21) Appl. No.: 16/553,657

(22) Filed: Aug. 28, 2019

(51) Int. Cl.
| | |
|---|---|
| *H05B 37/02* | (2006.01) |
| *H04W 4/33* | (2018.01) |
| *H04L 29/12* | (2006.01) |
| *H04L 29/08* | (2006.01) |
| *G05B 19/042* | (2006.01) |
| *H04W 4/80* | (2018.01) |

(52) U.S. Cl.
CPC ....... *H05B 37/0272* (2013.01); *G05B 19/042* (2013.01); *H04L 61/2069* (2013.01); *H04L 67/12* (2013.01); *H04W 4/33* (2018.02); *H05B 37/0218* (2013.01); *H05B 37/0227* (2013.01); *G05B 2219/25011* (2013.01); *H04W 4/80* (2018.02)

(58) Field of Classification Search
CPC ............... H05B 37/02; H05B 37/0218; H05B 37/0227; H05B 37/0272; H05B 33/08; H04W 4/33; H04W 4/80; H04L 61/2069; H04L 67/12; G05B 19/042; G05B 2219/25011
See application file for complete search history.

(56) References Cited

U.S. PATENT DOCUMENTS

| | | |
|---|---|---|
| 4,918,690 A | 4/1990 | Markkula, Jr. et al. |
| 4,969,147 A | 11/1990 | Markkula, Jr. et al. |
| 6,353,853 B1 | 3/2002 | Gravlin |
| 6,580,950 B1 | 6/2003 | Johnson et al. |

(Continued)

FOREIGN PATENT DOCUMENTS

WO     2018024528 A1    2/2018

OTHER PUBLICATIONS

Related U.S. Appl. No. 15/479,093, Notice of Allowance, dated Mar. 21, 2019.

(Continued)

*Primary Examiner* — Jimmy T Vu
(74) *Attorney, Agent, or Firm* — McGeary Cukor LLC; Kenneth Ottesen; Jason Paul DeMont

(57) ABSTRACT

A distributed control system featuring the coordination of functionality among peer controller nodes. The controller nodes are luminaires that are capable of controlling the ambient lighting within a building area. Within the control system, there are one or more ambient light sensors for reporting the ambient light level by publishing data packets containing sensor values. The controller luminaire nodes are members of a defined group of nodes that behave according to the same set of rules. Each controller node is capable of generating a control signal in response to detecting the data packets containing a group address to which the controller node is subscribed. In particular, a first controller node generates a first control signal for controlling a lamp if a subscribed-to group address is detected, wherein the control signal is determined by an aggregate function whose input values include the sensor values in the data packets.

20 Claims, 8 Drawing Sheets

(56) References Cited

U.S. PATENT DOCUMENTS

| | | |
|---|---|---|
| 6,756,998 B1 | 6/2004 | Bilger |
| 6,792,319 B1 | 9/2004 | Bilger |
| 6,873,610 B1 | 3/2005 | Noever |
| 6,912,429 B1 | 6/2005 | Bilger |
| 7,092,772 B2 | 8/2006 | Murray et al. |
| 7,437,596 B2 | 10/2008 | McFarland |
| 7,486,193 B2 | 2/2009 | Elwell |
| 7,555,658 B2 | 6/2009 | Vahid et al. |
| 7,680,745 B2 | 3/2010 | Hunter |
| 7,817,994 B2 | 10/2010 | Funk et al. |
| 8,001,219 B2 | 8/2011 | Moorer et al. |
| 8,013,732 B2 | 9/2011 | Petite et al. |
| 8,023,440 B2 | 9/2011 | Nass et al. |
| 8,050,801 B2 | 11/2011 | Richards et al. |
| 8,155,142 B2 | 4/2012 | Moorer et al. |
| 8,209,398 B2 | 6/2012 | Moorer et al. |
| 8,271,881 B2 | 9/2012 | Moorer et al. |
| 8,275,471 B2 | 9/2012 | Huizenga et al. |
| 8,725,845 B2 | 5/2014 | Moorer et al. |
| 8,793,022 B2 | 7/2014 | Uden |
| 8,806,209 B2 | 8/2014 | Hemphill et al. |
| 8,964,708 B2 * | 2/2015 | Petite .................. G01V 1/364 370/338 |
| 9,049,038 B2 | 6/2015 | Cavalcanti |
| 9,210,192 B1 | 12/2015 | Kim et al. |
| 9,867,260 B2 | 1/2018 | Kicklighter et al. |
| 9,945,574 B1 | 4/2018 | Sloo et al. |
| 10,057,062 B2 | 8/2018 | Nadathur et al. |
| 10,143,067 B1 | 11/2018 | Slupik et al. |
| 10,200,504 B2 | 2/2019 | Decenzo et al. |
| 10,218,794 B2 | 2/2019 | Slupik |
| 10,339,791 B2 | 7/2019 | Baum et al. |
| 10,359,746 B2 | 7/2019 | Slupik et al. |
| 10,365,619 B2 | 7/2019 | Mousavi et al. |
| 10,382,284 B1 | 8/2019 | Slupik et al. |
| 10,382,452 B1 | 8/2019 | Dawes et al. |
| 10,389,736 B2 | 8/2019 | Dawes et al. |
| 2003/0040812 A1 | 2/2003 | Gonzales et al. |
| 2003/0137396 A1 | 7/2003 | Durej et al. |
| 2006/0028997 A1 | 2/2006 | McFarland |
| 2006/0074494 A1 | 4/2006 | McFarland |
| 2007/0060147 A1 | 3/2007 | Shin et al. |
| 2007/0156256 A1 | 7/2007 | Jung |
| 2007/0232288 A1 | 10/2007 | McFarland et al. |
| 2008/0191866 A1 | 8/2008 | Falck et al. |
| 2008/0298302 A1 | 12/2008 | Ishida |
| 2009/0066473 A1 | 3/2009 | Simons |
| 2009/0141741 A1 | 6/2009 | Kim et al. |
| 2009/0222541 A1 | 9/2009 | Monga et al. |
| 2010/0008272 A1 | 1/2010 | Messinger et al. |
| 2010/0073148 A1 | 3/2010 | Banks et al. |
| 2010/0074234 A1 | 3/2010 | Banks et al. |
| 2010/0236824 A1 | 9/2010 | Roosli |
| 2011/0069665 A1 | 3/2011 | Erdmann et al. |
| 2011/0080264 A1 | 4/2011 | Clare et al. |
| 2011/0213867 A1 | 9/2011 | McCoy et al. |
| 2012/0080893 A1 | 4/2012 | Bernard et al. |
| 2013/0085615 A1 | 4/2013 | Barker |
| 2013/0109406 A1 | 5/2013 | Meador et al. |
| 2013/0132609 A1 | 5/2013 | Meier |
| 2013/0291100 A1 | 10/2013 | Ganapathy et al. |
| 2013/0335219 A1 | 12/2013 | Malkowski |
| 2014/0163751 A1 | 6/2014 | Davis et al. |
| 2014/0244044 A1 | 8/2014 | Davis et al. |
| 2014/0293276 A1 | 10/2014 | Hughes et al. |
| 2014/0328211 A1 | 11/2014 | Holleis et al. |
| 2014/0336821 A1 | 11/2014 | Blaine et al. |
| 2014/0358285 A1 | 12/2014 | Aggarwal et al. |
| 2016/0170389 A1 | 6/2016 | Im et al. |
| 2016/0234186 A1 | 8/2016 | Leblond et al. |
| 2016/0344670 A1 | 11/2016 | Wu et al. |
| 2016/0381144 A1 | 12/2016 | Malik et al. |
| 2017/0016643 A1 | 1/2017 | Combe et al. |
| 2017/0034123 A1 | 2/2017 | Ritmanich et al. |
| 2017/0118636 A1 | 4/2017 | Zoorob |
| 2017/0171071 A1 | 6/2017 | Turon |
| 2017/0293273 A1 | 10/2017 | Slupik et al. |
| 2017/0311415 A1 | 10/2017 | Rozendaal et al. |
| 2019/0020494 A1 * | 1/2019 | Roosli ................ H04L 12/2807 |
| 2019/0190741 A1 | 6/2019 | Wendt |

OTHER PUBLICATIONS

Related U.S. Appl. No. 16/417,400, Office action dated Sep. 3, 2019.

International Search Report, International Application No. PCT/US2016/018862.

Written Opinion of the International Search Authority, International Application No. PCT/US2016/018862.

Related U.S. Appl. No. 15/553,019, Notice of Allowance, dated Nov. 8, 2018.

Related U.S. Appl. No. 15/910,338 Notice of Allowance, dated Apr. 18, 2019.

International Search Report, PCT/US2019/019365, dated Jun. 25, 2019.

Written Opinion of the International Search Authority, PCT/US2019/019365, dated Jun. 25, 2019.

Related U.S. Appl. No. 16/417,400, Notice of Allowance, dated Oct. 15, 2019.

* cited by examiner

COORDINATED PROCESSING OF PUBLISHED SENSOR VALUES WITHIN A DISTRIBUTED NETWORK

CROSS-REFERENCES TO OTHER APPLICATIONS

This application is related to "System and Method for Space-Driven Building Automation and Control including Actor Nodes Subscribed to a Set of Address including Addresses that are Representative of Spaces within a Building to be Controlled," U.S. Pat. No. 10,359,746, incorporated by reference herein. This application is also related to "System and Method for Decision-Making Based on Source Addresses," U.S. Pat. No. 10,218,794, incorporated by reference herein. This application is also related to "System and Method for Commissioning Mesh Network-Capable Devices within a Building Automation and Control System," U.S. Pat. No. 10,382,284, incorporated by reference herein.

FIELD OF THE INVENTION

The present invention relates to building automation and control in general, and, more particularly, to the coordinated processing of published sensor values within a distributed network.

BACKGROUND OF THE INVENTION

"Commercial building automation," or "commercial automation," refers to the use of computer and information technology to control commercial building systems, such as lighting, HVAC, audio-visual, smoke detection, security, and shading, among others. Using specialized hardware and control logic, building devices can monitor their environment and can be controlled automatically. Although commercial automation has been available at some level of sophistication for some time, it steadily becomes more practical, from both a technological and cost perspective.

A sophisticated commercial automation and control system might include sensors (e.g., of temperature, of light, of motion, etc.), controllers (e.g., a general-purpose personal computer, a dedicated automation controller, etc.), and actuators or actors (e.g., motorized valves, switches, etc.). The system might also include a human-machine interface device that enables an occupant of the building to interact with the system. The interface can be a specialized terminal or an application ("app") running on a smartphone or tablet computer. The various system devices communicate over dedicated wiring, or over a wired network, or wirelessly, using one or more protocols.

Lighting automation and control systems now exist in which luminaires that comprise sensors, lamps, and control logic are networked together, in what is sometimes referred to as "connected lighting" or networked "smart lighting." In such a network, sensors which can be standalone and/or integrated into the luminaire nodes collect data about the local environment, such as data related to ambient lighting in the vicinity of the luminaires. The networked luminaires communicate with one another, in some cases sharing the sensor data, and adjust the light output of the lamps via the control logic, with some level of coordination across the networked luminaires.

FIG. 1 depicts connected lighting network 100 in the prior art. Network 100 comprises smart nodes 101-1 through 101-M, wherein M is a positive integer (e.g., M being equal to 5 as depicted, etc.). As depicted in FIG. 1, the nodes are luminaires (denoted by "L"). Additionally, each of the luminaires comprises an ambient light sensor. The networked nodes communicate wirelessly with one another via transmitted signals 102-1, 102-2, 102-3, 102-4, and 102-5. The group of nodes can be situated within a building or other structure.

Network 100 is a mesh data network that enables communication among smart nodes 101-1 through 101-M. To this end, the nodes within network 100 distribute data (e.g., the packet-based messages, etc.) in accordance with Bluetooth mesh networking. A "mesh network" is a network topology in which each node relays data for the network. The nodes that are involved cooperate in the distribution of data in the network.

Being a mesh network, network 100 is an example of a distributed control system. Distributed control systems have some advantages over centralized control systems, including in some cases the elimination of a single point of failure and the reduction of processor load. Furthermore, technologies such as Bluetooth mesh networking can enable a single, published message to be processed by more than one network node; for example, each sensor data message can be acted upon by more than one node.

SUMMARY OF THE INVENTION

A connected lighting network typically must adapt to continually changing lighting conditions. In an office complex, for example, people regularly walk in and out of rooms, and objects are regularly being placed in the sensor field, such as shiny material-clad laptops and dark-colored bags. A smart lighting node is designed to react to changes in the ambient light, but can often react incorrectly. For instance, a smart lighting system can comprise sensors that measure ambient light reflected off a surface they overlook in an area that they monitor. Such a lighting system might react incorrectly to a change detected by the sensors by adjusting the ambient lighting when a shiny laptop is opened or closed or when a bag is moved into or out from the sensor field. To compound problems, the distributed nature of smart lighting being implemented within a mesh network complicates the control of the overall ambient light.

The present invention enables, in either a mesh network or another network of a distributed control system, the coordination of lighting or other functionality among peer devices. Sensor values that are published by ambient light sensors are processed by controller nodes that are subscribed to detect and act on at least some of the sensor values being published. The sensor values themselves are aggregated by the subscribed controller nodes. As a result, a local distortion of a value being reported by one sensor—caused by a shiny laptop cover being closed, for instance—does not impact the light level within a defined area in a building.

In accordance with the illustrative embodiment of the present invention, a controller node in a wireless network is subscribed to a first group address. The controller node is configured to control the lighting output level of a lamp, as described below. The first group address corresponds to a zone, such as a room or other space within a building. In some embodiments of the present invention, the selection of which devices coordinate with one another is based on a floor plan that is prepared during an off-site commissioning phase, and then the devices are appropriately configured to be associated with one or more zones during an on-site phase.

For example and without limitation, a first group of network nodes can be associated with a first group address, and a second group of network nodes can be associated with a second group address, wherein all of the nodes belonging to the first group address behave the same as one another, and while the nodes of the first group address and the nodes of the second group address behave differently across the two groups. For instance, the nodes of the first group address might apply a higher gain to their lighting output levels than the nodes of the second group address.

The controller node proceeds to monitor for data packets that are transmitted by other nodes, such as sensor nodes that are configured to operate within the wireless network. The controller node detects the data packets, including a) a first data packet published by a first sensor node and containing a first sensor value and b) a second data packet published by a second sensor node and containing a second sensor value.

The controller node is capable of generating a control signal in response to detecting the data packets, depending on their sensor values. In particular, the first controller node generates the control signal if the first group address is both a) detected in the first and second data packets mentioned earlier and b) subscribed to by the first controller node. The control signal is determined by an aggregate function whose input values include the first sensor value and the second sensor value. The aggregate function can be the arithmetic mean of the sensor values or the median of the sensor values, for example and without limitation. The particular aggregate function that the controller node uses can vary depending on the circumstances. The controller node then performs a predetermined function dependent on the control signal, such as controlling the lighting output level of a lamp.

In some techniques of coordinating peer devices in the prior art, the peer devices maintain and share their internal states with one another, thereby controlling the physical condition being monitored, such as the ambient light level. Advantageously, the distributed control system of the illustrative embodiment requires no synchronization across peer devices, although synchronization across the peer devices may coexist with various embodiments of the present invention, if needed. Also, the aggregate function is selected, in some cases dynamically, so that a local distortion of a value reported by a first sensor impacts minimally, if at all, the light level in a particular building space.

An illustrative first controller node configured to operate within a wireless network comprises: a receiver configured to detect data packets that are transmitted by other nodes configured to operate within the wireless network, including a) a first data packet published by a first sensor node and containing a first sensor value and b) a second data packet published by a second sensor node and containing a second sensor value; a processor configured to: i) subscribe the first controller node to a first non-empty set of subscribed-to addresses, including a first group address, wherein the subscribed-to addresses are stored in a memory, and ii) generate a first control signal in response to detecting the data packets, wherein the processor is configured to generate the first control signal only if at least one of the subscribed-to addresses is detected in the first and second data packets, wherein the first control signal is determined by an aggregate function whose input values include the first sensor value and the second sensor value; and an actor unit configured to perform a predetermined function dependent on the first control signal.

An illustrative method for automation and control within a building comprises: receiving, by a first controller node configured to operate within a wireless network, a first set of signals for subscribing the first controller node to a first non-empty set of subscribed-to addresses, including a first group address; detecting, by the first controller node, data packets that are transmitted by other nodes configured to operate within the wireless network, including a) a first data packet published by a first sensor node and containing a first sensor value and b) a second data packet published by a second sensor node and containing a second sensor value; generating, by the first controller node, a first control signal in response to detecting the data packets, wherein the first controller node generates the first control signal only if at least one of the subscribed-to addresses is detected in the first and second data packets, wherein the first control signal is determined by an aggregate function whose input values include the first sensor value and the second sensor value; and performing, by the first controller node, a predetermined function dependent on the first control signal.

An illustrative non-transitory tangible computer readable medium storing computer executable code comprises code for causing a first controller node within a wireless network to: receive a first set of signals for subscribing the first controller node to a first non-empty set of subscribed-to addresses, including a first group address; detect data packets that are transmitted by other nodes configured to operate within the wireless network, including a) a first data packet published by a first sensor node and containing a first sensor value and b) a second data packet published by a second sensor node and containing a second sensor value; generate a first control signal in response to detecting the data packets, wherein the first controller node generates the first control signal only if at least one of the subscribed-to addresses is detected in the first and second data packets, wherein the first control signal is determined by an aggregate function whose input values include the first sensor value and the second sensor value; and perform a predetermined function dependent on the first control signal.

DETAILED DESCRIPTION

Figure 1:
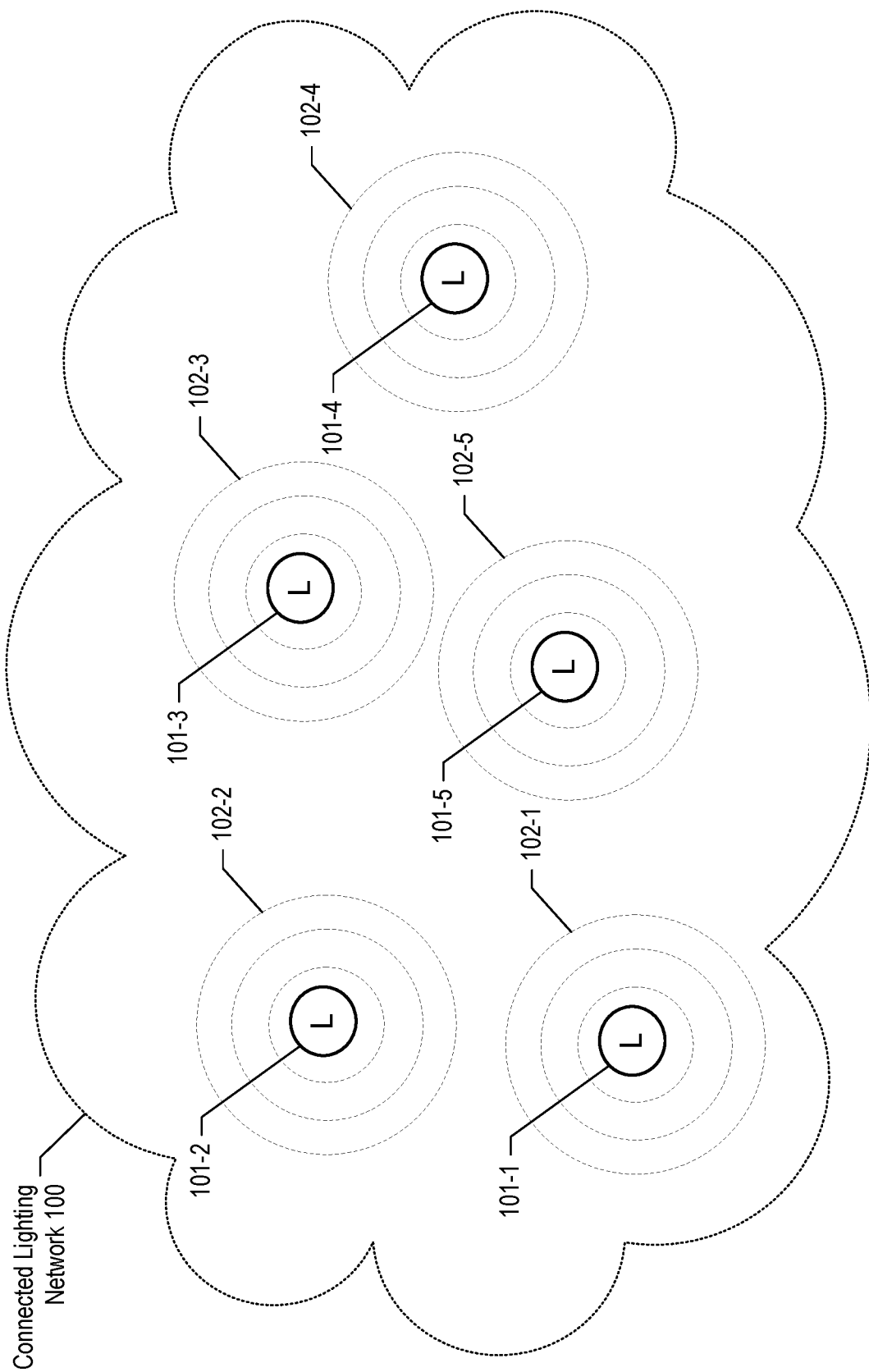
FIG. 1 depicts connected lighting network 100 in the prior art.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Aggregate Function—For the purposes of this specification, the term "aggregate function" (or "aggregation function") is defined as a function in which the values of multiple inputs are grouped together to form a single summary value.

Control—For the purposes of this specification, the infinitive "to control" and its inflected forms (e.g., "controlling", "controlled", etc.) should be given the ordinary and customary meaning that the terms would have to a person of ordinary skill in the art at the time of the invention.

Controller Node—For the purposes of this specification, the term "controller node" is defined as a node in a data network and comprising a controller that is configured to control an actor unit by generating one or more output values that are used by the actor unit.

Sensor Node—For the purposes of this specification, the term "sensor node" is defined as a node in a data network comprising a sensor unit that is configured to monitor a physical condition and to report sensor data values of the physical condition.

Generate—For the purposes of this specification, the infinitive "to generate" and its inflected forms (e.g., "generating", "generated", etc.) should be given the ordinary and customary meaning that the terms would have to a person of ordinary skill in the art at the time of the invention.

Lamp—For the purposes of this specification, the term "lamp" is defined as a device for providing illumination, comprising an electric bulb and its holder.

Luminaire—For the purposes of this specification, the term "luminaire" is defined as a lighting unit comprising a lamp and a controller for controlling the lamp. A luminaire is an example of a controller node.

Network address—For the purposes of this specification, the term "network address," or "computer network address," is defined as a numerical label assigned to each device (e.g., sensor node, controller or actor node, configuring node, etc.) participating in a computer network. For example, an Internet Protocol address (IP address) is a numerical label assigned to each device participating in a computer network that uses the Internet Protocol for communication. A "source address" is an example of a network address, in that it specifies the device that originated a transmitted data packet or message conveyed by one or more packets.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

To facilitate explanation and understanding of the present invention, the following description sets forth several details. However, it will be clear to those having ordinary skill in the art, after reading the present disclosure, that the present invention may be practiced without these specific details, or with an equivalent solution or configuration. Furthermore, some structures, devices, and operations that are well known in the art are depicted in block diagram form in the accompanying figures in order to keep salient aspects of the present invention from being unnecessarily obscured.

Figure 2:
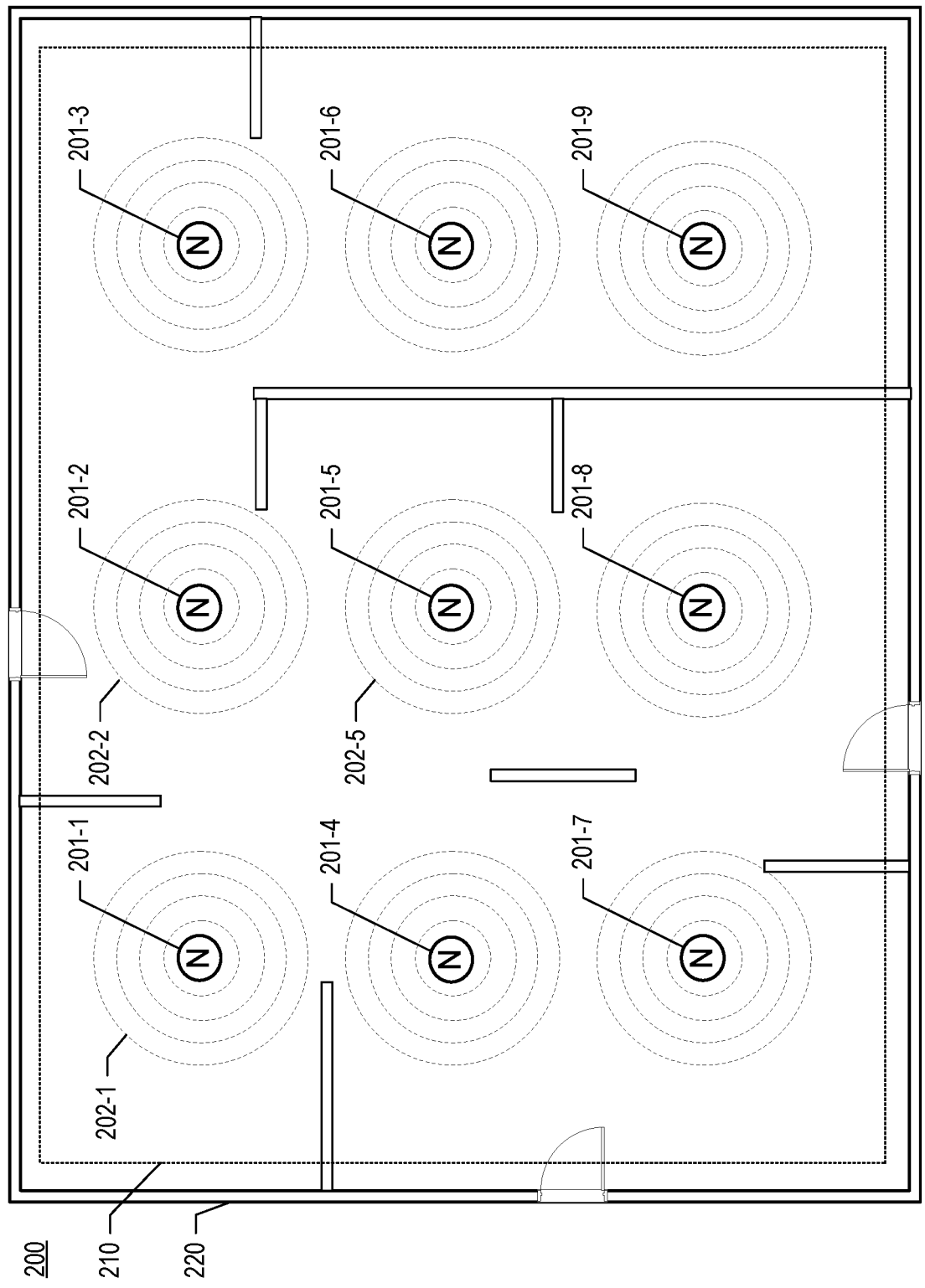
FIG. 2 depicts building control system 200 and mesh network 210 in accordance with the illustrative embodiment.

FIG. 2 depicts building control system 200 in accordance with the illustrative embodiment, which comprises network nodes 201-1 through 201-M (labeled with an "N" for "node"), wherein M is a positive integer (e.g., M equal to 9 as depicted, etc.) situated within building 220. Network nodes 201-1 through 201-M make up data network 210; as mesh nodes, they are provisioned devices that are, as a result, capable of operating within a mesh network.

Control system 200 is an example of a system having distributed logic. More particularly, in control system 200 of the illustrative embodiment, control functionality is distributed among the network nodes. Being equally privileged with one another, network nodes 201-1 through 201-M are peer devices to one another. With nodes 201-1 through 201-M operating as "smart nodes," control system 200 provides "connected lighting" or networked "smart lighting."

Data network 210 is a mesh network, as is known in the art, and enables communication among network nodes 201-1 through 201-M, wherein M is a positive integer (e.g., M equal to 9 as depicted, etc.). To this end, the nodes within network 210 distribute data (e.g., the packet-based messages, etc.) among one another in accordance with mesh networking. A "mesh network" is a network topology in which each node relays data for the network. The nodes that are involved cooperate in the distribution of data in the network. A mesh network can relay messages—for example, by using a flooding technique and/or a routing technique.

In accordance with the illustrative embodiment, mesh network 210 uses Bluetooth as the underlying radio technology to communicate among devices. As those who are skilled in the art will appreciate after reading this specification, network 210 can use a different radio technology than Bluetooth. The requirements to enable an interoperable mesh networking for Bluetooth wireless technology are defined in the Bluetooth Mesh Networking specifications, including the "Mesh Profile Specification," Revision v1.01, Jan. 21, 2019, which is incorporated by reference herein. Additional information is defined in the "Bluetooth Core Specification," Revision v5.0, which is incorporated by reference herein.

Each mesh network node (or "mesh node") in FIG. 2 is an apparatus that comprises memory, processing components, and communication components. In addition to communication with other nodes, each mesh node is capable of performing one or more functions, as described below.

Each mesh node can be a wireless terminal or device, a wireless transmit/receive unit (WTRU), a user equipment (UE), a mobile station, wireless handset, a fixed or mobile subscriber unit, a cellular telephone or cellphone, a smartphone, a pager, a personal digital assistant (PDA), an Internet of Things (IoT) device, an access terminal, a computer, a laptop computer, a desktop computer, a tablet computer, and so on, for example and without limitation.

In accordance with the illustrative embodiment, the depicted mesh nodes communicate using the Bluetooth protocol, a packet-based protocol with a master-slave structure. A Bluetooth device is configured to establish links with one or more target devices that have Bluetooth transceivers. Bluetooth devices operate in the Industrial, Scientific and Medical (ISM) 2.4 GHz short-range radio frequency band. Bluetooth devices use a radio technology referred to as "frequency-hopping spread spectrum," in which transmitted data is divided into one or more packets 111 and are transmitted on a designated Bluetooth frequency (e.g., channel).

The Bluetooth wireless communication standard is typically employed for exchanging communications between fixed or mobile Bluetooth-enabled devices over short distances. In some configurations, the systems and methods disclosed herein may be applied to Bluetooth Low Energy (or "Bluetooth LE" or "BLE") devices. The BLE extension of the Bluetooth standard is focused on energy-constrained applications such as battery-operated devices, sensor applications, and so on. The BLE extension was referred to formerly as "Bluetooth Smart."

This description uses terminology associated with the Bluetooth and Bluetooth LE standards. As those who are skilled in the art will appreciate after reading this specification, however, the concepts can be applied to other technologies and standards that involve modulating and transmitting digital data. Such technologies and standards include, but are not limited to, Z-Wave, ZigBee, Thread, Wi-Fi, classic Bluetooth, and so on. Accordingly, while some of this description is provided in terms of Bluetooth standards, the systems and methods disclosed herein can be implemented more generally in wireless communication devices that might not conform to Bluetooth standards.

It should be noted that the Bluetooth Mesh protocol can be used on non-Bluetooth devices (e.g., a WiFi-Bluetooth gateway). These non-Bluetooth devices can implement Mesh to receive one or more packets (e.g., a network protocol data unit [PDU]) remotely over the Transmission Control Protocol (TCP) and/or User Datagram Protocol (UDP) and then may send one or more packets over BLE.

In BLE mesh terminology, a transmitting or receiving mesh node can be referred to as a "mesh bearer." A bearer is the protocol over which a mesh network packet is transmitted or received. For example, BLE Advertisements, BLE Generic Attributes (GATT) Connection, TCP/UDP, and so on can be transmitted or received by a mesh bearer.

The nodes within data network 210 are depicted according to how they are situated within building 220, according to a floor plan. As depicted in FIG. 2, nodes 201-1 through 201-M ("nodes 201") are luminaires. Each node comprises a controller unit and an actor unit—in the illustrative embodiment, a luminaire with controller logic and comprising a controllable lamp as an actor unit. Additionally, at least some of nodes 201 further comprise an ambient light sensor (ALS) unit that measures illuminance, which is also referred to herein as a "first physical condition." The networked nodes communicate wirelessly with one another via transmitted signals 202-1, 202-2, and so forth, via network 210.

In some embodiments of the present invention, one or more of mesh nodes 201 might not have an ambient light sensor unit present, while in some other embodiments some mesh nodes might be present that have an ambient light sensor unit but no lamp. In some embodiments, one or more of the mesh nodes might have a different kind of sensor unit for monitoring a different physical condition than ambient light (e.g., occupancy, etc.), instead of or in addition to an ambient light sensor unit, while in some other embodiments one or more of the mesh nodes might have a kind of actor unit present instead of, or in addition to, a lamp. The controlled function being performed by the actor unit might be something instead of, or in addition to, light level output. Furthermore, in some alternative embodiments of the present invention, one or more of the depicted elements can communicate via wired connections.

Node 201-*m*, wherein m has a value between 1 and M, inclusive, is an apparatus that comprises memory, processing components, and communication components. Node 201-*m* is configured to transmit signals 202-*m* that convey control-related information, such as packet-based messages containing sensor values. Node 201-*m* is also configured to provide light at an output that is based, at least in part, on the content of one or more data packet messages received from one or more other luminaires (e.g., sensor data messages, etc.). In some embodiments of the present invention, node 201-*m* can also be configured to sense one or more physical conditions (e.g., illuminance, motion, occupancy, etc.) and can transmit (e.g., publish, etc.) messages based on the one or more physical conditions sensed. Node 201-*m* is described in detail below and in FIG. 3.

In accordance with the illustrative embodiment, nodes 201 constitute an automation and control system—more specifically, a networked lighting system—in a commercial building, such as an office space or a retail space. As those who are skilled in the art will appreciate after reading this specification, however, the luminaires can also be applied to a different type of building, such as a home, or to include the environment surrounding the building, or to any environment in which automated control can be applied.

Furthermore, building 220 can be a different type of structure with a roof and walls, or can instead be a defined area that comprises multiple sub-areas (e.g., open space, cubicles, one or more conference rooms, one or more corridors, one or more closed offices, etc.). At least a portion of the area and/or sub-areas can be defined by something other than a roof and/or walls (e.g., a tent, an outdoor pavilion, a covered parking lot, a stadium or arena, etc.).

As depicted, nodes 201 are positioned uniformly in a grid-like pattern. However, as those who are skilled in the art will appreciate after reading this specification, the luminaires can be positioned in any geometry or geometries with respect to one another, provided that each luminaire is within communication range of one or more of the other luminaires.

Figure 3:
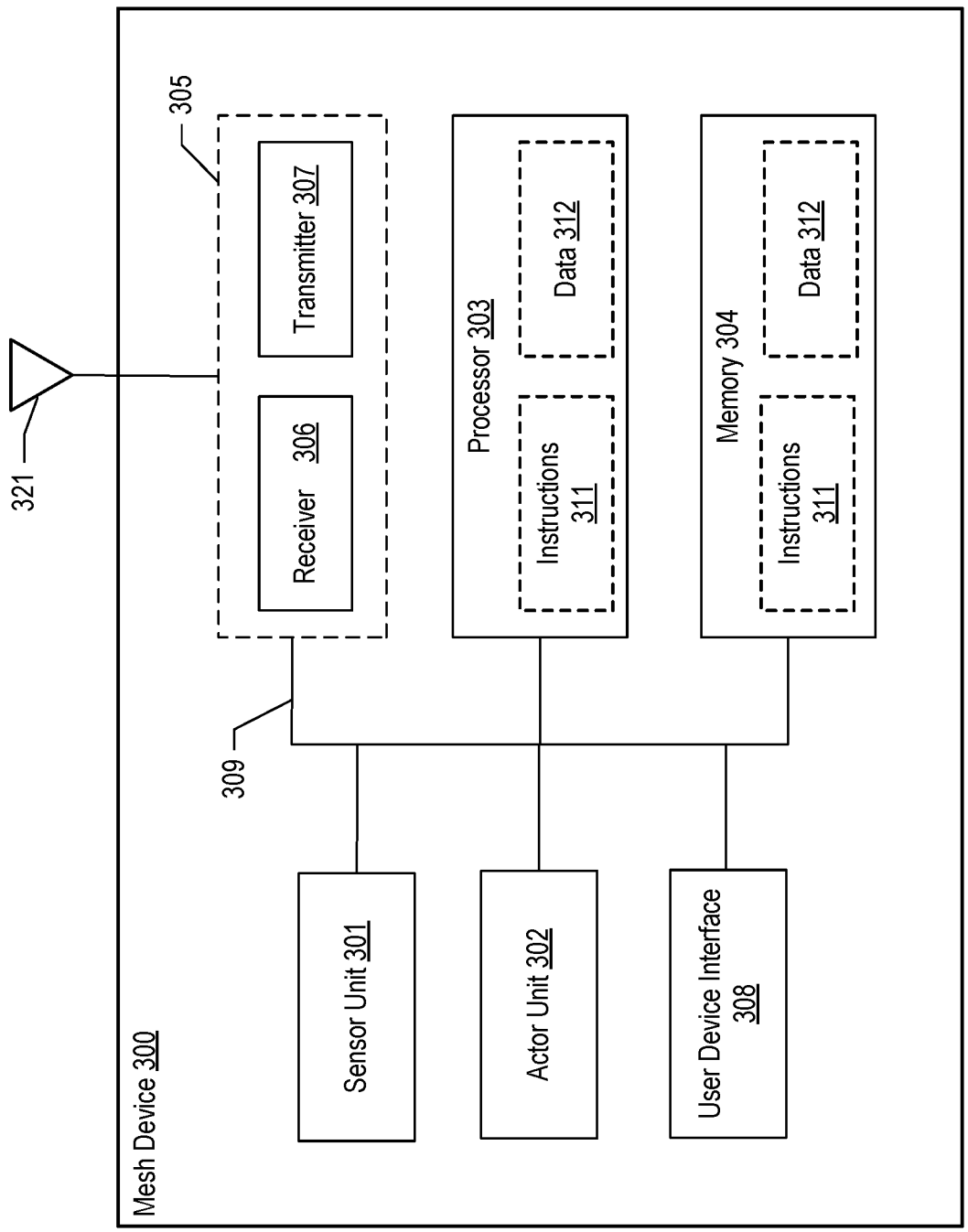
FIG. 3 depicts the salient components of mesh device 300 according to the illustrative embodiment.

FIG. 3 depicts the salient components of mesh device 300 according to the illustrative embodiment. Device 300 is based on a data-processing apparatus whose hardware platform comprises at least some of: sensor unit 301, actor unit 302, processor 303, memory 304, transceiver 305, and user device interface 308, interconnected as shown. Mesh device 300 is a device (e.g., a Bluetooth device, etc.) that is capable of being provisioned and thus becoming a mesh node and a member of mesh network 210. For example, the mesh device 300 can be provisioned as any of nodes 201-1 through 201-M of FIG. 2.

Various nodes within mesh network 210 can comprise different combinations of sensors, actors, processors, memory, and transceivers. For example, some nodes (e.g., controller nodes, etc.) within mesh network 210 can comprise a controllable lamp (i.e., an actor unit), a processor, a transceiver, and, optionally, a sensor unit (e.g., ambient light sensor, occupancy sensor, etc.), although some such nodes might not comprise a sensor unit. Some other nodes (e.g., sensor-only nodes, etc.) within mesh network 210, for example, can comprise a sensor unit, possibly a separate processor, and a transceiver, but not necessarily an actor unit (e.g., lamp, etc.). As those who are skilled in the art will appreciate after reading this specification, different configurations of mesh nodes are possible, wherein each node is based on one or more of the components that are described below.

Sensor unit 301 is an apparatus that comprises memory, processing components, and communication components, and is configured to gather information about the environment that is accessible by the sensor unit. Mesh device 300 can have one or more sensor units 301, wherein each sensor is configured to monitor a particular physical condition in well-known fashion (e.g., temperature, illuminance of ambient lighting, humidity, motion, occupancy, etc.). In accordance with the illustrative embodiment, a first sensor unit 301 is an ambient light sensor (ALS) measuring in terms of illuminance.

Each sensor unit is configured to report a state of the condition by providing input signals to processor 303, wherein the values of the input signals are representative of the states being reported. A given sensor unit 301 can report discrete input signal values and/or a continuum of states and can report states at particular times and/or continuously. A change in state, which is determined by processor 303 as described below, can occur based one or more sensor units detecting changes in the following, in any combination:

i. environmental probes (e.g., temperature, ambient light, motion or occupancy, infrared signature, humidity, air quality, sound level, etc.).

ii. electrical inputs (i.e., binary, analog, bus), including from a switch.

iii. signals received via radio (e.g., proximity beacons, etc.).

iv. a state of the internal logic, woken up periodically based on time or on an external event.

For example and without limitation, a state change can correspond to a switch being actuated, occupancy being detected, a timer or counter reaching a predefined value, and so on.

Actor unit 302 is an apparatus that comprises memory, processing components, and communication components, and is capable of doing something in the course of being affected by signals originating externally to the actor component, such as from processor 303, as described in detail below. Mesh device 300 can have one or more actor units 302, wherein each actor unit acts upon its environment in well-known fashion. In accordance with the illustrative embodiment, a first actor unit 302 is a lamp.

Actor unit 302 is configured to receive, transmit, process, and/or relay signals conveying data, as well as being configured to affect a condition, physical or otherwise, in its environment, for example by generating a first control signal. Actor unit 302 provides or performs a predetermined function, such as a lamp giving off light according to a configurable light output and controlled by a first control signal generated by processor 303. For example and without limitation, the condition being affected can be:

i. lighting, which can be adjusted (e.g., turning on or off, changing light output, changing brightness, changing color or mood, changing illuminance, displaying a picture or pattern, etc.).

ii. sound, which can be adjusted (e.g., increasing or decreasing volume, changing playlist or mood, turning on/off, selecting signal source, etc.).

iii. room climate, which can be controlled (e.g., increasing or decreasing temperature, humidity, air fragrance, fan speed, etc.).

iv. an alert, which can be generated (e.g., of an email, of an SMS message, etc.).

v. monitoring by a camera, which can be panned or tilted.

vi. office meeting/presentation settings (e.g., selecting one or more of signal source, streaming application, multimedia to play, audio language, subtitles, chapter, play/pause/stop, rewind/fast forward, etc.).

vii. connected/smart video monitor features (e.g., selecting application to be launched, navigating through on-screen menus, etc.).

viii. virtual keyboard—navigation on virtual keyboard displayed by other device (e.g., video monitor, set-top box, etc.).

ix. control of shades/window coverings/blinds.

x. access control (e.g., unlocking/locking doors, opening/shutting doors, authorizing access to selected rooms or zones, etc.).

Furthermore, device 300 can comprise any combination of and any number of actor functions. As those who are skilled in the art will appreciate, after reading this disclosure, device 300 that comprises one or more actor functions can be in a variety of forms, such as a luminaire in a lighting system, a media player as part of an audio/video system, a heater and/or ceiling fan as part of an environment control system, an outgoing-email server as part of a messaging system, an actor in a water sprinkler system, a pump, a robot or robotic arm, a pan/tilt camera, a switch, a motor, a servo mechanism, and so on.

Processor 303 is a processing device such as a general-purpose single- or multi-chip microprocessor (e.g., an Advanced RISC [Reduced Instruction Set Computer] Machine [ARM]), a special purpose microprocessor (e.g., a digital signal processor [DSP]), a microcontroller, a programmable gate array, and so on. For example and without limitation, the processor can be part of an nRF52832 integrated circuit (IC) by Nordic Semiconductor, which is integrated with Bluetooth, or can be a SAM3X IC by Atmel Corporation.

Figure 4:
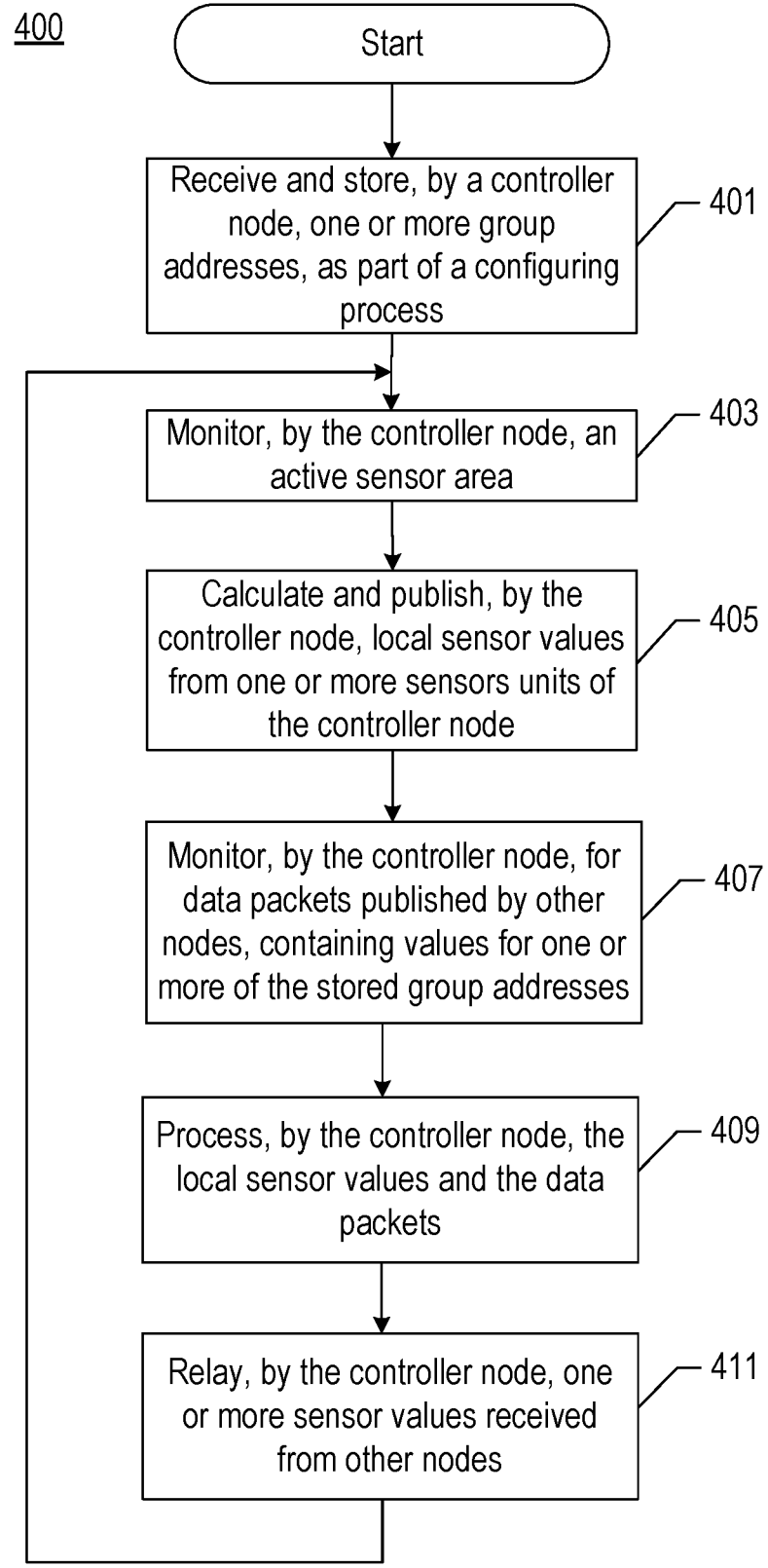
FIG. 4 depicts salient operations of method 400 according to the illustrative embodiment, by which each node 201-*m* performs various functions in view of sensor values being published within mesh network 210.

Processor 303 is configured such that, when operating in conjunction with the other components of device 300, processor 303 executes software in the form of instructions 311, processes data in the form of data 312, and telecommunicates according to the operations described herein, including at least some of those depicted in FIG. 4 and other flow diagrams. Processor 303 can be referred to as a "central processing unit" (CPU). Although just a single processor 303 is shown as part of mesh device 300 of FIG. 3, in an alternative embodiment a combination of processors (e.g., an ARM and DSP) can be used.

Memory 304 is non-transitory and non-volatile computer storage memory technology that is well known in the art. Memory 304 is in electronic communication with processor 303 (i.e., the processor can read information from and/or write information to the memory). Memory 304 can be any electronic component capable of storing electronic information. Memory 304 can be configured as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Memory 304 is configured to store an operating system, application software in the form of instructions 311, and a database in the form of data 312. The operating system is a collection of software that manages, in well-known fashion, device 300's hardware resources and provides common services for computer programs, such as those that constitute the application software.

The application software that is executed by processor 303 according to the illustrative embodiment enables device 300 to perform the functions disclosed herein. Instructions 311 that constitutes the application software can include one or more programs, routines, sub-routines, functions, procedures, code, and so on. The instructions may include a single computer-readable statement or many computer-readable statements. Instructions 311 may be executable by processor 303 to implement the methods disclosed herein. Executing the instructions may involve the use of the data 312 that is stored in memory 304. When processor 303 executes instructions 311, various portions of the instructions can be loaded onto processor 303, and various pieces of data 312 can be loaded onto processor 303.

It will be clear to those having ordinary skill in the art how to make and use alternative embodiments that comprise more than one memory 304; or comprise subdivided segments of memory 304; or comprise a plurality of memory technologies that collectively store the operating system, application software, and database.

Transceiver 305, which is a communication interface, is configured to enable device 300 to telecommunicate with other devices and systems, including other mesh network nodes, by receiving signals therefrom and/or transmitting signals thereto via receiver 306 and transmitter 307, respectively. Transceiver 305 communicates in accordance with Bluetooth mesh networking. In some other embodiments, transceiver 305 communicates via one or more other radio telecommunications protocols other than or in addition to Bluetooth mesh networking, as described earlier.

Receiver 306 is a component that enables device 300 to telecommunicate with other components and systems by receiving signals that convey information therefrom and through antenna 321. It will be clear to those having ordinary skill in the art how to make and use alternative embodiments that comprise more than one receiver 306.

Transmitter 307 is a component that enables device 300 to telecommunicate with other components and systems by transmitting signals that convey information thereto and through antenna 321. It will be clear to those having ordinary skill in the art how to make and use alternative embodiments that comprise more than one transmitter 307.

In accordance with the illustrative embodiment, device 300 uses transceiver 305 in order to telecommunicate wirelessly with external devices. It will clear to those skilled in the art, however, after reading the present disclosure, how to make use and use various embodiments of the present invention in which device 300 communicates via a wired protocol (e.g., X10, KNX, etc.) over physical media (e.g., cable, wire, etc.) with one or more external devices, either in addition to or instead of the wireless capability provided by transceiver 305. In some embodiments of the present invention, transceiver 305 is implemented on hardware that is physically distinct from that of processor 303, while in some other embodiments transceiver 305 is implemented on the same hardware (IC) as processor 303.

As depicted, mesh device 300 has a single transceiver 305. As those who are skilled in the art will appreciate after reading this specification, mesh device 300 can have multiple transceivers. Furthermore, each transceiver 305 can have one or more receivers 306 and/or one or more transmitters 307.

In some embodiments of the present invention, mesh device 300 also comprises user device interface 308. Interface 308 enables a user to interact with mesh device 300 and can comprise a touchscreen, a keyboard, a pointing device, a display, and so on, for example and without limitation.

The various components of mesh device 300 can be coupled together by one or more buses, which may include a power bus, a control signal bus, a status signal bus, a data bus, and so on. For purposes of clarity, the various buses are illustrated collectively in FIG. 3 as bus system 309.

Overall Operations of Node 201-*m*:

FIG. 4 depicts salient operations of method 400 according to the illustrative embodiment, by which each node 201-*m* performs various functions related to the coordination of its own actions, in view of sensor values being published both by itself and by other nodes within mesh network 210.

In regard to method 400, as well as to the other methods depicted in the flowcharts and message flow diagrams contained herein, it will be clear to those having ordinary skill in the art, after reading the present disclosure, how to make and use alternative embodiments of the disclosed methods in which the recited operations, sub-operations, and messages are differently sequenced, grouped, or sub-divided—all within the scope of the present invention. It will be further clear to those skilled in the art, after reading the present disclosure, how to make and use alternative embodiments of the disclosed methods wherein some of the described operations, sub-operations, and messages are optional, are omitted, or are performed by other elements and/or systems than the illustrative devices associated with the respective methods.

For illustrative purposes, node 201-5 in FIG. 2 is described as performing the operations described below and in the subsequent figures. As those who are skilled in the art will appreciate, after reading this specification, at least some of the other nodes within network 210 can perform all of the described operations; furthermore, multiple nodes can perform concurrently the described operations.

In accordance with operation 401, node 201-5 receives signals that convey one or more group addresses and stores the one or more group addresses, as part of a configuring process. U.S. Pat. Nos. 10,359,746 and 10,382,284 are incorporated by reference herein and describe respectively how one or more mesh nodes are organized according to spaces within a building and how the one or more mesh nodes are organized by group addresses. For the purposes of this disclosure, nodes 201-1 through 201-M are organized into zones defined by one or more group addresses according to FIG. 5. A zone can be representative of a space or can be representative of something else. In storing each group address and being configured to subsequently monitor for the stored group address, it is said that node 201-5 subscribes to (e.g., by its processor, etc.), or is subscribed to, the group address.

Figure 5:
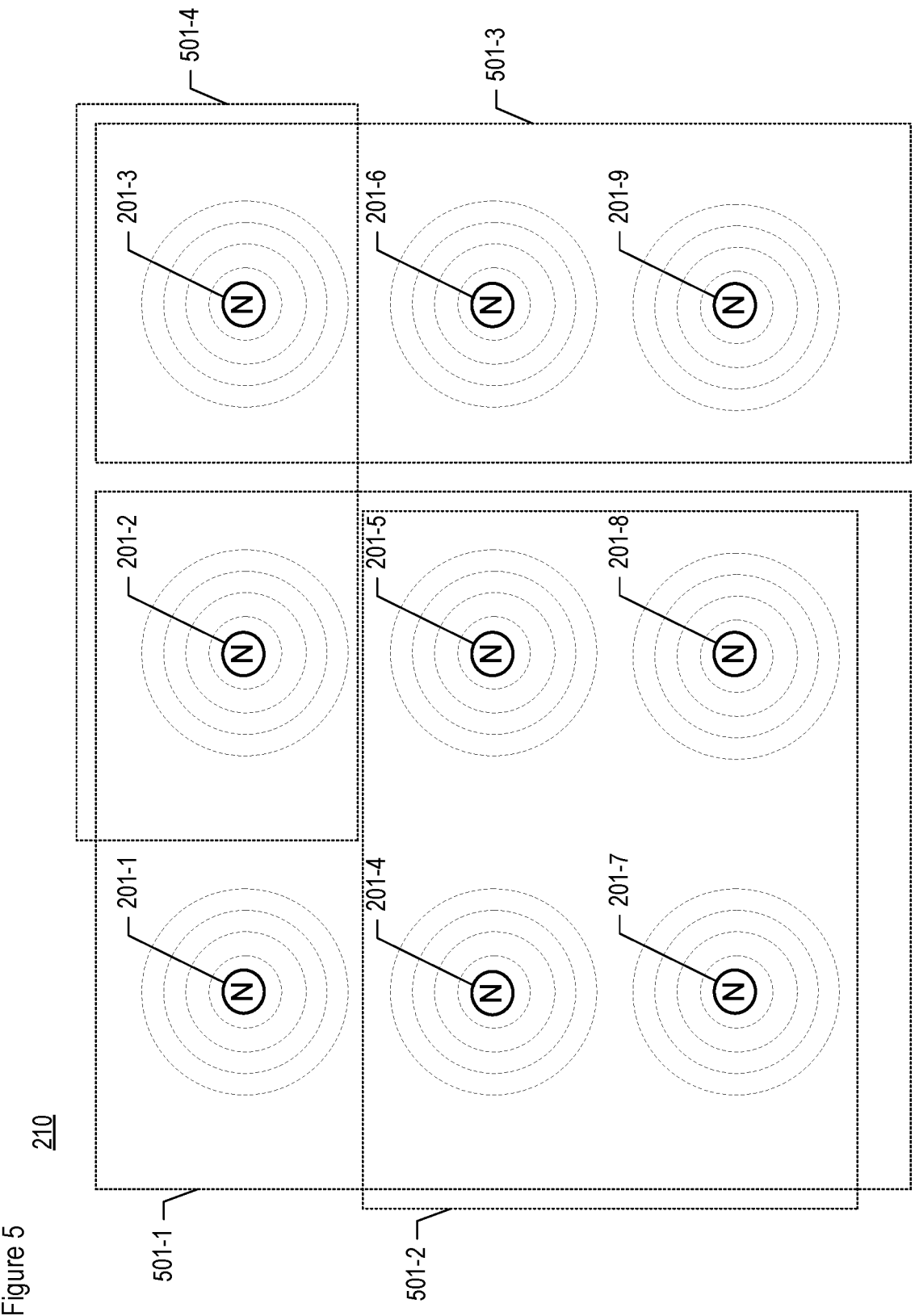
FIG. 5 depicts nodes 201-1 through 201-M in mesh network 210 organized into group addresses.

FIG. 5 depicts nodes 201-1 through 201-M in mesh network 210 organized into group addresses that correspond to zones 501-1 through 501-4. Specifically, nodes 201-1, 201-2, 201-4, 201-5, 201-7, and 201-8 are part of zone 501-1 corresponding to a first group address. Nodes 201-4, 201-5, 201-7, and 201-8 are part of zone 501-2 corresponding to a second group address; as depicted, zone 501-2 is a subarea of zone 501-1. Nodes 201-3, 201-6, and 201-9 are part of zone 501-3 corresponding to a third group address. Nodes 201-2 and 201-3 are part of zone 501-4 corresponding to a fourth group address; as depicted, zone-501-4 overlaps with subareas of zones 501-2 and 501-3. As those who are skilled in the art will appreciate after reading this specification, Nodes 201-1 through 201-M can be organized differently than depicted, and any node can be a member of one or more groups that are respectively identified by one or more group addresses.

In accordance with operation 403, node 201-5 monitors some or all of the area sensed by its sensor unit 301, by receiving illuminance signals from one or more photocells that constitute the sensor unit.

In some embodiments of the present invention, and in accordance with operation 405, node 201-5 calculates and transmits (e.g., publishes, etc.) a sensor value based on measurements made from one or more of the illuminance signals from the photocells in its ambient light sensor 301. U.S. patent application Ser. No. 16/168,755 is incorporated by reference herein and describes how a node calculates and transmits an illuminance sensor value. For the purposes of this disclosure, a sensor value that is calculated from measurements made by a node's own sensor unit is referred to as a "local sensor value." Node 201-5 publishes the local sensor value along with the node's source address and the one or more group addresses that correspond to the zones to which the node belongs, which are zones 501-1 and 501-2 as depicted in FIG. 5. In some other embodiments of the present invention in which node 201-5 has no local sensor, the node does not perform operation 405.

In some embodiments of the present invention, node 201-5 can publish a local sensor value for a different physical condition (e.g., a motion or occupancy indication, a non-motion or non-occupancy indication, etc.). In embodiments, node 201-5 publishes sensor values for all physical condition (e.g., illuminance, etc.) to all group addresses to which the node is subscribed. In some other embodiments, other node 201-5 publishes sensor values of different physical sensor values to respective different group addresses, such as sensor values for a first physical condition (e.g., illuminance, etc.) to a first group address, as sensor values for a second physical condition (e.g., illuminance, etc.) to a second group address, and so on.

In accordance with operation 407, node 201-5 monitors for published messages that contain values for one or more of the group addresses stored in accordance with operation 401.

In accordance with operation 409, node 201-5 processes one or more published messages that contain the values being monitored for in accordance with operation 407. Operation 409 is described below and in regard to FIG. 6.

In accordance with operation 411, and in accordance with mesh network protocol, node 201-5 relays one or more published messages that contain the sensor values received from other nodes, so that other nodes may receive the sensor values.

After operation 411, control of task execution proceeds back to operation 403, in part to repeatedly generate and publish sensor values (i.e., to be used by other nodes 201) and to detect and process sensor values that are being published by from other nodes 201.

Figure 6:
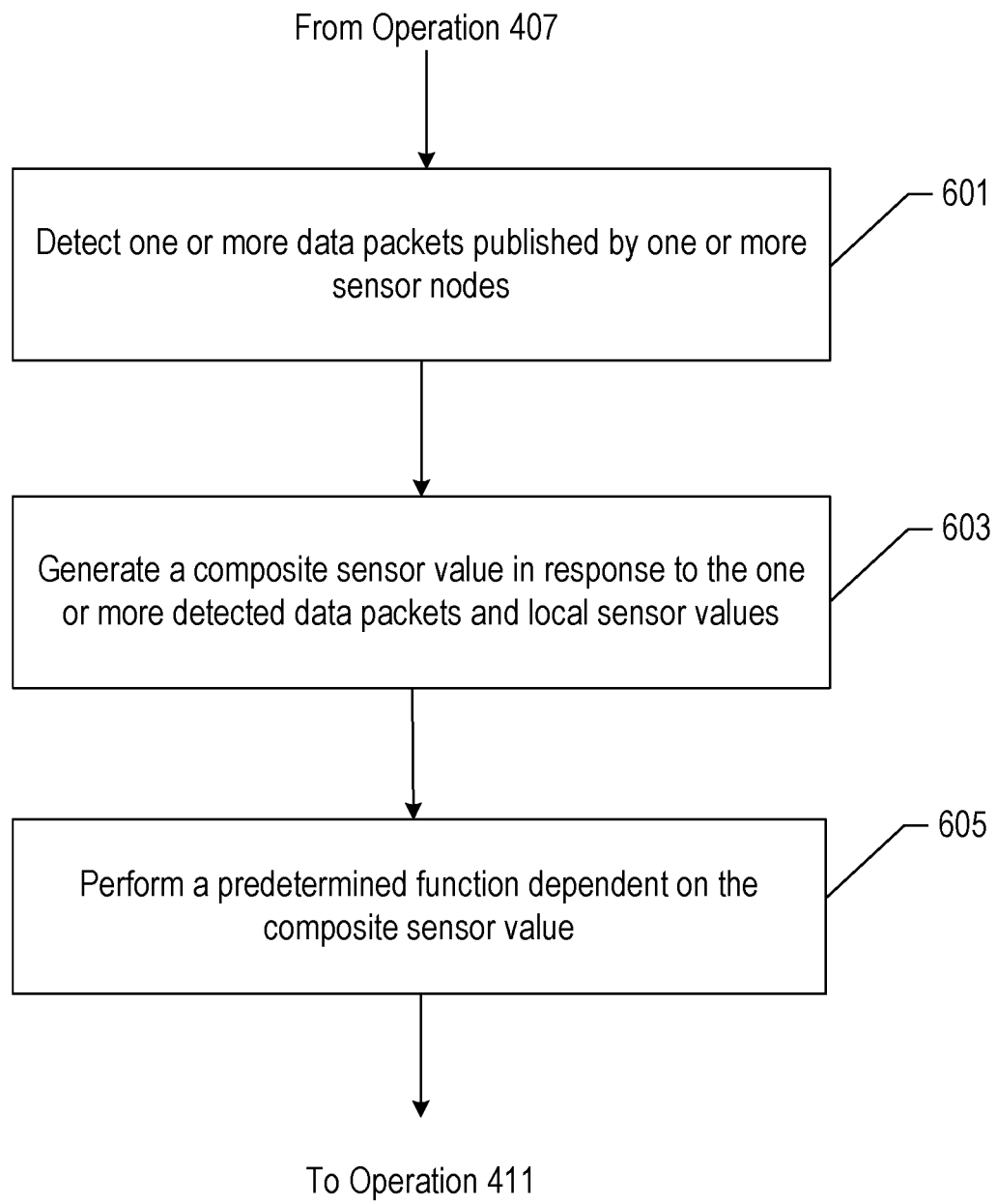
FIG. 6 depicts salient sub-operations in operation 409 of method 400.

Operations of Node 201-m in Processing Sensor Values:

FIG. 6 depicts salient sub-operations in operation 409 according to the illustrative embodiment, by which node 201-5 performs various functions related to processing sensor values. The sensor values originate within node 201-5 and/or are published in data packets by other nodes within data network 210, wherein a data-packet message to be processed by node 201-5 contains a group address that matches a group address stored in accordance with operation 401 (i.e., that is subscribed to by node 201-5).

In accordance with operation 601, node 201-5 detects one or more sensor values published by other nodes, along with one or more group addresses identified. In accordance with the illustrative embodiment, node 201-5 acts on a published sensor value only if a group address that is contained in the same message as the sensor value matches a group address stored in node 201-5's memory in accordance with operation 401. In some embodiments of the present invention, node 201-5 can act on a sensor value even if the group address does not match, but instead the node calculates a composite sensor value in a first way (e.g., according to a first aggregate function as described below) if the group address matches and in a second way (e.g., according to a second aggregate function) if the group address does not match.

In accordance with operation 603, node 201-5 generates a control signal based on, in any combination, one or more of:

i. a local sensor value of a first physical condition (e.g., illuminance) calculated in accordance with operation 405 (i.e., if a local sensor is present), and ii. one or more sensor values of the first physical condition detected in accordance with operation 601, and iii. a local sensor value of a second physical condition (e.g., occupancy), and iv. one or more sensor values of the second physical condition received in accordance with operation 601.

Some non-limiting examples of how a controller node can use one or more subscribed-to group addresses to generate a control signal are provided here. In some embodiments of the present invention, a first control signal is generated only if a first group address is both a) detected in a first data packet containing a first sensor value and second data packet containing a second sensor value and b) subscribed to by the first controller node. In those embodiments in which the controller node subscribes to a single group address to which multiple sensors publish, sensors are discriminated by their source addresses. In some other embodiments of the present invention, a first control signal is generated only if group addresses that are subscribed to by the controller node are detected in a first data packet containing a first sensor value and second data packet containing a second sensor value, even if the first and second data packets contain different subscribed-to group addresses. In those embodiments in which the controller node subscribes to multiple group addresses, sensors are discriminated by the group each sensor publishes to and/or their source addresses. U.S. Pat. No. 10,218,794 is incorporated by reference herein and describes how the controller node can, in general, base its decision-making on discriminating across the different source addresses in the published data packet messages.

As those who are skilled in the art will appreciate after reading this specification, operation 603 can be performed when needed, periodically or sporadically, based on absolute time (e.g., every J milliseconds, etc.), or based on activity related to a different operation (e.g., every K relevant sensor values that are detected in operation 601, etc.), or both. Operation 603 is described below and in regard to FIG. 7.

In accordance with operation 605, node 201-5 performs a predetermined function involving its actor unit 302 and dependent on the control signal generated in accordance with operation 603. Operation 605 is described below and with respect to FIG. 8.

After operation 605, control of task execution proceeds to operation 411.

Figure 7:
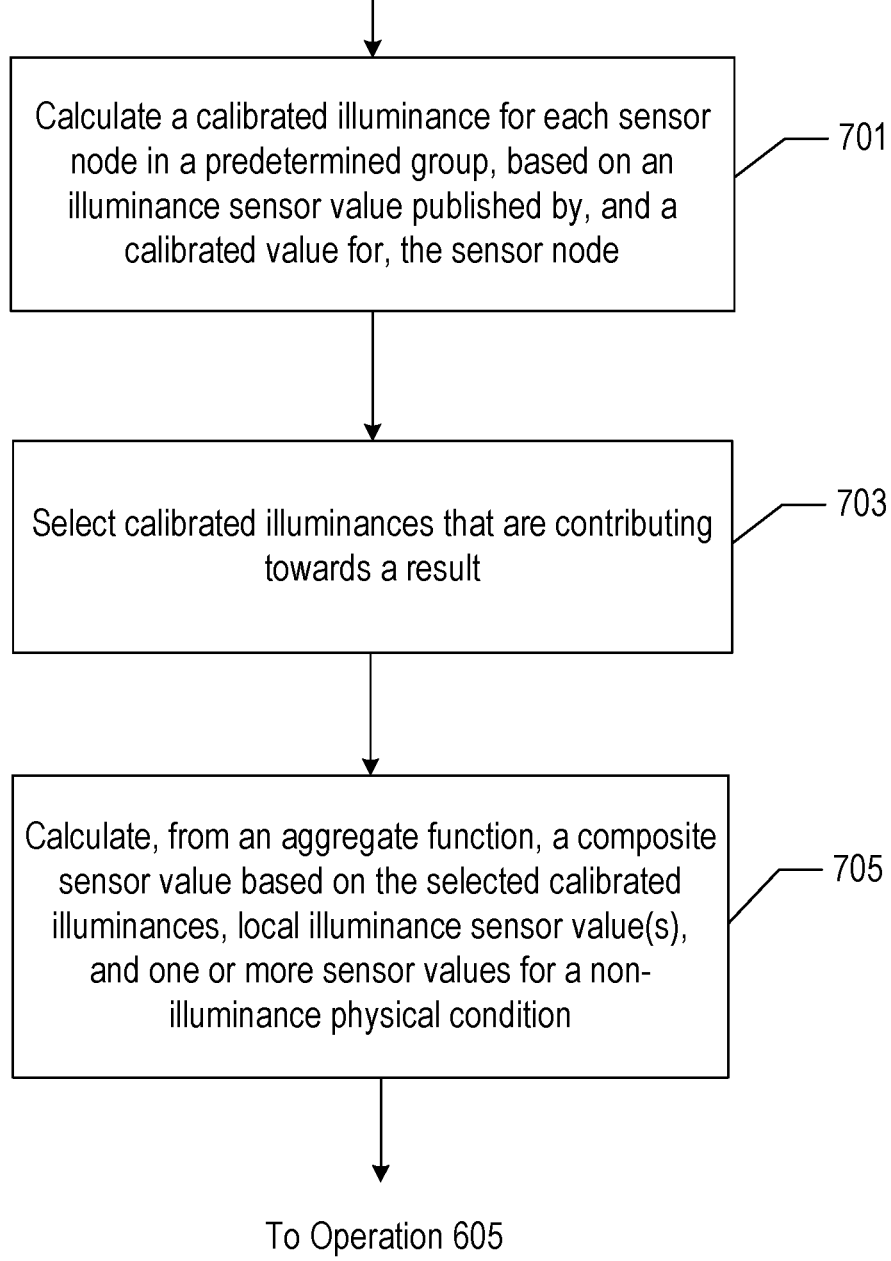
FIG. 7 depicts salient sub-operations in operation 603 of operation 411.

Operations of Node 201-m in Calculating a Composite Sensor Value:

FIG. 7 depicts salient sub-operations in operation 603 according to the illustrative embodiment, by which sensor node 201-5 calculates a composite sensor value, based on one or more sensor values measured by node 201-5 itself and/or on one or more sensor values published by other nodes in data packets detected by node 201-5.

In some embodiments of the present invention, in accordance with operation 701, processor 303 of node 201-5 calculates a logarithmic calibrated illuminance (LCI) for each illuminance sensor value that is received from a node 201-i that is uniquely identified by its source address, or self-generated (i.e., as a local sensor value), and that is in a predetermined group (e.g., identified by group address), according to the equation:

$$LCI_i = \log(MI_i) + LCC_i, \quad \text{(Eq. 1)}$$

wherein:

$MI_i$ is the illuminance light level published by node 201-i within said group, and $LCC_i$ is a calibration value for illuminance sensor values published by node 201-i.

$LCC_i$ can be calculated ahead of time by turning on all light sources and measuring the actual illuminance value with a calibrated lux meter, resulting in a measurement, RI. Then, a calibration value can be calculated for each node 201-$i$ according to the equation:

$$LCC_i = \log(RI) - \log(CMI_i), \quad \text{(Eq. 2)}$$

wherein:
- $LCC_i$ is the logarithmic calibration correction,
- RI is the illuminance measured by the lux meter during the calibration procedure, and
- $CMI_i$ is the illuminance reported by node 201-$i$ during the calibration procedure.

Processor 303 of node 201-5 performs at least some of the processing in the log domain, in order to reduce errors. As those who are skilled in the art will appreciate after reading this specification, in some other embodiments of the present invention the calculations can be performed linearly instead of logarithmically, or not at all.

In some embodiments of the present invention, in accordance with operation 703, processor 303 of node 201-5 filters out illuminance sensor values received from other nodes whose illuminance signals are potentially being affected by incidental factors. Such factors include people passing through the area being monitored by the group of ambient light sensors, small items being left on a surface within the monitored area, a reflective laptop cover being opened or closed, and neighboring light sources, for example and without limitation. For example, a person wearing dark clothes might enter the room; as the dark materials absorbs light, the nodes in the group of interest might sense erroneously that the light level itself is lower. The calculation performed by processor 303 seeks to eliminate or at least mitigate the influence of local changes in illumination that are caused by such factors.

To this end, processor 303 of node 201-5 selects a subset of illuminance sensor values (e.g., proper subset, improper subset, etc.) within the sensor values under consideration, based on the similarity of their LCI values (i.e., calibrated measurements) to one another. Similarity can be based, for example, on the closeness in value of the LCI values to one another.

In some embodiments of the present invention, the sensor values are selected based on the degree to which LCI values of the received sensor values in operation 601 of the light levels sensed by the various nodes within the group of interest are within a predetermined numeric range of one another. In some embodiments of the present invention, the predetermined range can be defined as those values corresponding to the nodes 201 within the group of interest having the N closest values to each other. The range, for example, can be defined as a ratio or percentage (e.g., 50%, etc.) of all the sensor values received from the nodes belonging to the group of interest (i.e., N out of A nodes, wherein A is the number of nodes in the group of interest). In some other embodiments of the present invention, operation 703 is skipped entirely.

In accordance with operation 705, processor 303 of node 201-5 generates a composite sensor value calculated from an aggregate function (or "aggregation function") whose input values are one or more sensor values published by other nodes and/or generated by node 201-5 itself. For example, in those embodiments in which operations 701 and 703 are performed (i.e., logarithmic values are used), processor 303 calculates LuxOut according to the equation:

$$LuxOut = \exp(AV), \quad \text{(Eq. 3)}$$

wherein AV is the arithmetic mean (i.e., an aggregate function) of the $LCI_i$ values of the subset of nodes selected in accordance with operation 703.

In some embodiments of the present invention, one or more of the $LCI_i$ values (i.e., input values) are combined based on an aggregate function that is the arithmetic mean, while in some other embodiments the values are combined based on a different aggregate function. For example and without limitation, the aggregate function can be the mean, median, maximum, minimum, mode, standard deviation, count, range, or sum (i.e., addition or logical OR) of multiple sensor values.

In some embodiments of the present invention, the particular aggregate function is dependent on the number of sensor nodes that publish data packets to a particular group address. In other words, a first aggregate function can be applied for a first range of the number of sensor nodes, a second aggregate function can be applied for a second range of the number of sensor nodes, and so on. For example, the arithmetic mean of the input sensor values can be used (e.g., for ambient light sensors, for sensors that count the number of people, etc.), unless the number of sensor nodes providing said sensor values exceeds a predetermined amount (e.g., 5 or more, etc.), in which case the median can be used in order to account for extreme outliers in the sensor values.

Node 201-5 can determine the number of sensor nodes that publish data packets to the group address of interest, by examining the source address of each detected data packet in which the group address of interest is detected. For example, if node 201-5 detects that the same five source addresses are present in the data packets being published to a first group address, then it is determined that there are five sensor nodes publishing data packets to the first group address. In some other embodiments of the present invention, the identities of sensor nodes that are publishing to a given group address is provided to a controller node in advance.

In some embodiments of the present invention, the particular aggregate function is dependent on the particular physical condition that the sensors are monitoring. In other words, a first aggregate function can be applied for aggregating input sensor values of a first physical condition, a second aggregate function can be applied for aggregating input sensor values of a second physical condition, and so on. For example, the arithmetic mean of the input sensor values can be used if ambient light sensors are providing the sensor values; in contrast, a logical-OR function can be used if motion or occupancy sensors are providing the sensor values. Additionally, the particular aggregate function can be based on a combination of number of sensor nodes and type of physical condition being sensed.

In some embodiments of the present invention, processor 303 of node 201-5 calculates the composite sensor value based also on one or more sensor values received for a second physical condition. The aggregate function used by processor 303 for input sensor values of a first physical condition (e.g., illuminance, etc.) can change depending on one or more input sensor values for a second physical condition (e.g., occupancy, motion, people count, etc.). For example, for a first physical condition of illuminance as measured one or more ambient light sensors, processor 303 might use an aggregate function of arithmetic mean only. Continuing with the example, when a second physical condition of occupancy (or motion) as measured by one or more occupancy sensors indicates people being present (or motion occurring), then processor 303 might switch to using the median as the aggregate function, at least for certain numbers of ambient light sensors present. A rationale behind this example of switching to using the median is that people who move in and out of the sensor field can be a primary cause of distortions in the ambient light sensed, and a median aggregate function tends to handle outlier sensor values better.

In accordance with the illustrative embodiment, all controller nodes in a particular zone (i.e., as defined by a particular group address) follow the same rules of behavior, such as the rules that determine how a composite sensor value is generated. There might be multiple zones in a room or in other type of building area. Accordingly, different sets of parameters making up different rules of behavior can be assigned on a per-zone basis (i.e., a per-group basis) during commissioning. Although the particular aggregation function or functions that a controller node uses is based on the number and/or type of sensors as described above, these aggregation functions can be overridden during commissioning, in some embodiments of the present invention.

For example, a setup for rooms with windows might involve two zones, in which one (e.g., zone 501-3 in FIG. 5, etc.) comprises the lights close to windows and the other (e.g., zone 501-1, etc.) comprises lights further out from the windows. The two zones might be set up differently, depending on the location of daylight sensors. If there is an ALS sensor in each luminaire, the setup can be identical between the two zones. In contrast, if there are significantly fewer ALS sensors in the further-out zone (e.g., no ALS sensors in nodes 201-2 and 201-8 of zone 501-1), this zone can be configured as having higher "gain" applied in calculating the composite sensor value, in which the luminaires in that zone operate according to that area having to be lit brighter being further out from windows, while the sensors themselves are closer to windows.

The use of multiple group addresses can enable more advanced aggregation of sensor values. In a variation of the foregoing example, node 201-5 can calculate a simple, unweighted average (or other first aggregate function) of the sensor values publishing from each zone (501 1, 501-3, etc.), which corresponds to a different group address, resulting in an intermediate aggregation result representative of the zone. Node 201-5 can then calculate a weighted average (or other second aggregate function) of the intermediate results by assigning different weights to each intermediate result corresponding to each zone. For instance, the group that represents a zone that is closer to a window (e.g., zone 501-3, etc.) might have a stronger weight than the group that represents a zone that is further out from the window (e.g., zone 501-1, etc.).

Figure 8:
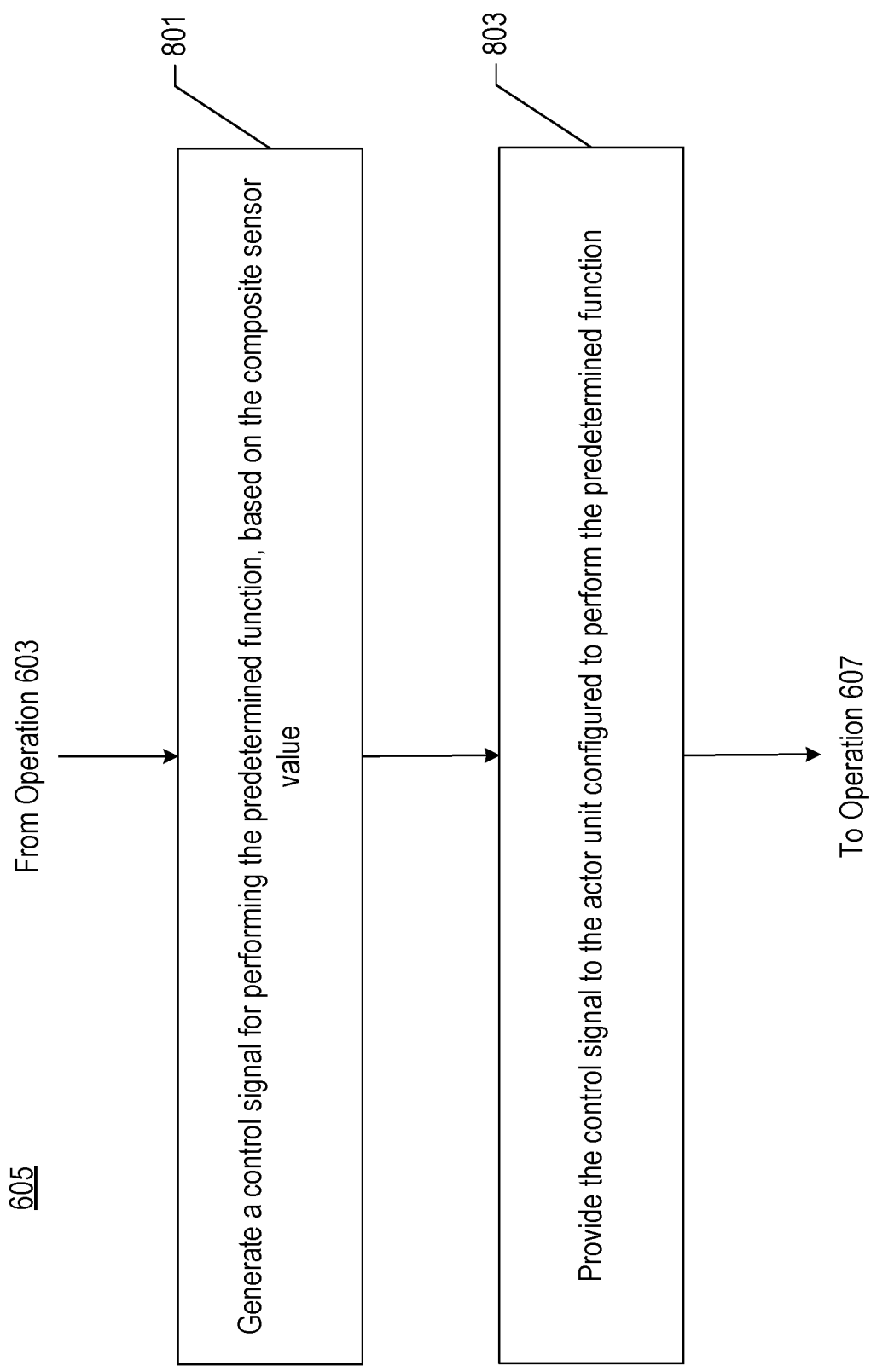
FIG. 8 depicts salient sub-operations in operation 605 of operation 411.

Operations of Node 201-$m$ in Performing a Predetermined Function:

FIG. 8 depicts salient sub-operations in operation 605, by which the luminaire performs various functions related to applying a first control signal generated from the composite sensor value described in operation 705 and to be used by the controlled lamp (i.e., the actor unit).

In accordance with operation 801, processor 303 of node 201-5 generates a first control signal to be provided to actor unit 302. The first control signal is based on the composite sensor value calculated in accordance with operation 705 and also depends on the electrical requirements and characteristics of the driver that is associated with the particular actor unit.

In accordance with operation 803, processor 303 provides the first control signal to actor unit 302, thereby causing the predetermined function to be performed, such as changing the output light level of a lamp.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, Blu-ray™ disc, and Ultra HD disc where disks usually reproduce data magnetically, while discs reproduce data optically with lasers.

It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A first controller node configured to operate within a wireless network, the first controller node comprising:
   a receiver configured to detect data packets that are transmitted by other nodes configured to operate within the wireless network, including a) a first data packet published by a first sensor node and containing a first sensor value and b) a second data packet published by a second sensor node and containing a second sensor value;
   a processor configured to:
      i) subscribe the first controller node to a first non-empty set of subscribed-to addresses, including a first group address, wherein the subscribed-to addresses are stored in a memory, and
      ii) generate a first control signal in response to detecting the data packets, wherein the processor is configured to generate the first control signal only if at least one of the subscribed-to addresses is detected in the first and second data packets, wherein the first control signal is determined by an aggregate function whose input values include the first sensor value and the second sensor value; and
   an actor unit configured to perform a predetermined function dependent on the first control signal.

2. The first controller node of claim 1 wherein the receiver is further configured to receive a first set of signals, and wherein the first controller node is subscribed to the first group address via the first set of signals.

3. The first controller node of claim 1 wherein the aggregate function is dependent on the number of sensor nodes that publish data packets to the first group address.

4. The first controller node of claim 3 wherein the aggregate function is an arithmetic mean of input values to the aggregate function, for at least some values of the number of sensor nodes that publish data packets to the first group address.

5. The first controller node of claim 4 wherein the aggregate function is a median of input values to the aggregate function if the number of sensor nodes that publish data packets to the first group address exceeds a predetermined value.

6. The first controller node of claim 3, wherein the first controller node is further configured to determine the number of sensor nodes that publish data packets to the first group address, from the source address of each detected data packet in which the first group address is detected.

7. The first controller node of claim 1 wherein the aggregate function is dependent on the physical condition being sensed by sensor nodes that publish data packets to the first group address.

8. The first controller node of claim 7 wherein the aggregate function is a sum of input values to the aggregate function if the physical condition being sensed is motion or occupancy.

9. The first controller node of claim 1 wherein the actor unit is a lamp and the predetermined function is lighting control.

10. The first controller node of claim 9 wherein the lamp is configured to change brightness of the lamp dependent on the processor generating the first control signal.

11. A method for automation and control within a building, comprising:
   receiving, by a first controller node configured to operate within a wireless network, a first set of signals for subscribing the first controller node to a first non-empty set of subscribed-to addresses, including a first group address;
   detecting, by the first controller node, data packets that are transmitted by other nodes configured to operate within the wireless network, including a) a first data packet published by a first sensor node and containing a first sensor value and b) a second data packet published by a second sensor node and containing a second sensor value;
   generating, by the first controller node, a first control signal in response to detecting the data packets, wherein the first controller node generates the first control signal only if at least one of the subscribed-to addresses is detected in the first and second data packets, wherein the first control signal is determined by an aggregate function whose input values include the first sensor value and the second sensor value; and
   performing, by the first controller node, a predetermined function dependent on the first control signal.

12. The method of claim 11 wherein the aggregate function is dependent on the number of sensor nodes that publish data packets to the first group address.

13. The method of claim 12 wherein the aggregate function is an arithmetic mean of input values to the aggregate function, for at least some values of the number of sensor nodes that publish data packets to the first group address.

14. The method of claim 13 wherein the aggregate function is a median of input values to the aggregate function if the number of sensor nodes that publish data packets to the first group address exceeds a predetermined value.

15. The method of claim 12, further comprising:
   determining, by the first controller node, the number of sensor nodes that publish data packets to the first group address, from the source address of each detected data packet in which the first group address is detected.

16. The method of claim 11 wherein the aggregate function is dependent on the physical condition being sensed by sensor nodes that publish data packets to the first group address.

17. The method of claim 16 wherein the aggregate function is a sum of input values to the aggregate function if the physical condition being sensed is motion or occupancy.

18. The method of claim 11 wherein the first control signal controls a lamp and the predetermined function is lighting control.

19. The method of claim 18 wherein the lamp is configured to change brightness of the lamp dependent on the first controller node generating the first control signal.

20. A non-transitory tangible computer readable medium storing computer executable code, comprising code for causing a first controller node within a wireless network to:
   receive a first set of signals for subscribing the first controller node to a first non-empty set of subscribed-to addresses, including a first group address;
   detect data packets that are transmitted by other nodes configured to operate within the wireless network, including a) a first data packet published by a first sensor node and containing a first sensor value and b) a second data packet published by a second sensor node and containing a second sensor value;
   generate a first control signal in response to detecting the data packets, wherein the first controller node generates the first control signal only if at least one of the subscribed-to addresses is detected in the first and second data packets, wherein the first control signal is determined by an aggregate function whose input values include the first sensor value and the second sensor value; and perform a predetermined function dependent on the first control signal.

* * * * *